United States Patent
Williams et al.

(10) Patent No.: US 6,766,009 B2
(45) Date of Patent: Jul. 20, 2004

(54) METHOD AND SYSTEM FOR CORRELATING TELEPHONE CALLS WITH INFORMATION DELIVERY

(75) Inventors: L. Lloyd Williams, Kanata (CA); Alexander Markman, Thornhill (CA); David Edward Johnston, Whitby (CA)

(73) Assignee: NewStep Networks Inc., Ottawa (CA)

( * ) Notice: Subject to any disclaimer, the term of this patent is extended or adjusted under 35 U.S.C. 154(b) by 295 days.

(21) Appl. No.: 10/092,809

(22) Filed: Mar. 7, 2002

(65) Prior Publication Data

US 2003/0169866 A1 Sep. 11, 2003

(51) Int. Cl.[7] .......................... H04M 7/00; H04M 3/00; H04M 5/00
(52) U.S. Cl. .............. 379/229; 379/220.01; 379/265.09
(58) Field of Search ................................ 379/229, 230, 379/207.02, 219, 220.01, 221.08–221.11, 221.15, 265.02, 265.09

(56) References Cited

U.S. PATENT DOCUMENTS

| 5,734,706 A | | 3/1998 | Windor ....................... 379/142 |
| 5,884,032 A | * | 3/1999 | Bateman et al. ............. 709/204 |
| 5,946,684 A | | 8/1999 | Lund ........................... 707/10 |
| 5,991,377 A | | 11/1999 | Malik .......................... 379/114 |
| 5,991,391 A | * | 11/1999 | Miloslavsky ........... 379/265.11 |
| 6,178,232 B1 | | 1/2001 | Latter et al. ............. 379/88.21 |
| 6,449,270 B1 | * | 9/2002 | Miloslavsky ................ 370/356 |
| 2001/0038623 A1 | | 11/2001 | Miloslavsky ................ 370/352 |
| 2003/0198218 A1 | * | 10/2003 | Farris et al. ................ 370/356 |

OTHER PUBLICATIONS

International Search Report dated Oct. 7, 2003, from corresponding PCT Application No. PCT/CA03/00322, filed Mar. 7, 2003.

* cited by examiner

*Primary Examiner*—Benny Q. Tieu
(74) *Attorney, Agent, or Firm*—Van Dyke, Gardner, Linn & Burkhart, LLP (57) ABSTRACT

A method and system for correlating information retrieved from a data network, with a telephone call initiated by an initial address message (IAM) at a multi-line facility, such as a call center or a voice access server (VAS), hinges on extracting an identifier string inserted into the user-user-interface field of the IAM, and accompanying the information. The information is used to perform an enhanced service feature which may include aiding the selection of an internal line at call center's call distributor, or the selection and customization of delivery of a service feature, at a VAS. The information may also be displayed at a display terminal associated with a call center agent handling the call.

28 Claims, 4 Drawing Sheets

METHOD AND SYSTEM FOR CORRELATING TELEPHONE CALLS WITH INFORMATION DELIVERY

CROSS-REFERENCE TO RELATED APPLICATIONS

This is the first application filed for the present invention.

MICROFICHE APPENDIX

Not applicable.

TECHNICAL FIELD

The present invention relates to the field of enhanced service feature provisioning on telecommunications networks, and, in particular, to a method and apparatus for coordinating a delivery of information related to a calling party with a telephone call to a termination, the information being delivered concurrently with call setup.

BACKGROUND OF THE INVENTION

Call centers are used by companies to communicate with customers or prospective customers for the purposes of sales, product support, service delivery, etc. Providing such services is costly. Consequently, systems for improving call handling efficiency at call centers are in demand.

The telephony equipment generally used in call centers is automatic call distributors (ACDs) or private branch exchanges (PBXs) connected to the public switched telephone network (PSTN) by integrated services digital network (ISDN) trunks. It is also common practice for companies that operate call centers to provide toll-free access to all interested parties.

One way that efficiency is improved in call centers is by delivering caller information to call center agents as, or shortly after, calls are received. A method for supplying caller information to a respective display terminal of a call center agent is known in the art. U.S. Pat. No. 5,734,706, which issued to Windsor et al. on Mar. 31, 1998, teaches a system for providing caller identification information to users of a key telephone system. In accordance with Windsor, calls are received/sent and caller/ed party information is displayed on a computer terminal associated with the telephone set that received/sent the call. Windsor's system supports up to 8 internal lines using a key telephone system. The system is therefore suitable for use only by call centers with small call volumes.

Moreover the caller/ed party information made available to the call center agents is limited to a log of calls from or to the directory number of the calling party; the name, and directory number of the calling party; and/or, the timing information and internal line used to receive logged call(s). Although 'notes' can be appended to logged calls, and the logs can contain any information pertaining to the calling party that the call center agents input, Windsor does not provide means for displaying information that is not locally stored by the call center. Since the storage of the information is time-consuming, and the information can only be accumulated for repeat callers, the system taught by Windsor is of limited value to call centers.

U.S. Pat. No. 5,946,684, which issued to Lund on Aug. 31, 1999, teaches a method for providing an enhanced service feature to telephone service subscribers. According to Lund, a central office switch serving a subscriber is adapted to access a database to look up a network address such as a universal resource locator (URL) associated with the calling party. The network address is displayed by the called party's personal computer. This enhanced service feature is available to telephone subscribers with a single line, and supplies calling party information to the called party. The calling party information provided by Lund's invention is associated with the directory number by the service provider. The inability to tailor the information to the needs of a called party is a limitation to the usefulness of this invention.

While the desire to provide caller-related information along with calls to call centers, or other call destinations that serve multiple lines, has long been recognized, a feasible solution is not known to exist.

There therefore remains a need for a method and system for correlating telephone calls with caller-related information at a facility equipped with a plurality of telephone lines.

SUMMARY OF THE INVENTION

It is therefore an object of the invention to provide a method and system for correlating a call setup signaling message with information received from a data network at a facility, with telephony equipment adapted to serve multiple telephone lines simultaneously.

It is also an object of the present invention to improve efficiency at facilities adapted to simultaneously serve multiple lines, such as call centers, voice access servers (VASs) and the like.

Accordingly, a method is provided involving a first step of inserting an identifier string into a call setup signaling message used to set up a telephone call for which an enhanced service feature requiring information, is requested. A second step of the method involves retrieving and sending the information with a copy of the identifier string, to a data network address of the facility, and a third step involves using the respective identifier strings to correlate the call setup signaling message with the information, in order to provide the enhanced service feature. As the call setup signaling message and information are received prior to establishment of the call, the information may be used to prepare the enhanced service feature before the call is established. For example, the information may be used to select a call center agent to handle the call.

The system of the present invention involves a facility and a call control application that controls a call control node. The call control application is sent call parameters from a call setup signaling message from the call control node. The call control application determines what, if any, enhanced service feature to apply to the call. If information retrieval is needed to perform an enhanced service feature to be applied to the call, the call control application will be programmed to issue an information delivery request that requests the information be sent to the facility. An information database is invoked to retrieve the information in the present invention, but it will be understood by those of skill in the art that any data retrieval mechanism would be equivalent. In particular, the call control application could send, directly to the facility, a key to retrieve data relating to the calling party, and so the information could be supplied by the call control application, in alternative embodiments of the invention. According to the invention, the identifier string is sent with the information, so that the information can be correlated with the call. The call control node is directed by the call control application to forward the call setup signaling message, which is relayed across the public switched telephone network (PSTN), to the facility.

The facility in the present system is any equipment (distributed or co-located) that terminates a call and can perform enhanced service features to augment the call requiring additional information that is supplied with information provided from a data network. In particular, it will be understood that when the facility supports several calls concurrently, the correlation of the information and the call is required in order to perform service features for the call, and so the facility particularly includes equipment adapted to terminate a plurality of lines simultaneously, and to provide services to the respective lines. It is assumed that the facility of the present invention incorporates a data server adapted to interface the facility with a data network.

BRIEF DESCRIPTION OF THE DRAWINGS

Further features and advantages of the present invention will become apparent from the following detailed description, taken in combination with the appended drawings, in which.

It should be noted that throughout the appended drawings, like features are identified by like reference numerals.

DETAILED DESCRIPTION OF THE PREFERRED EMBODIMENT

Figure 1:
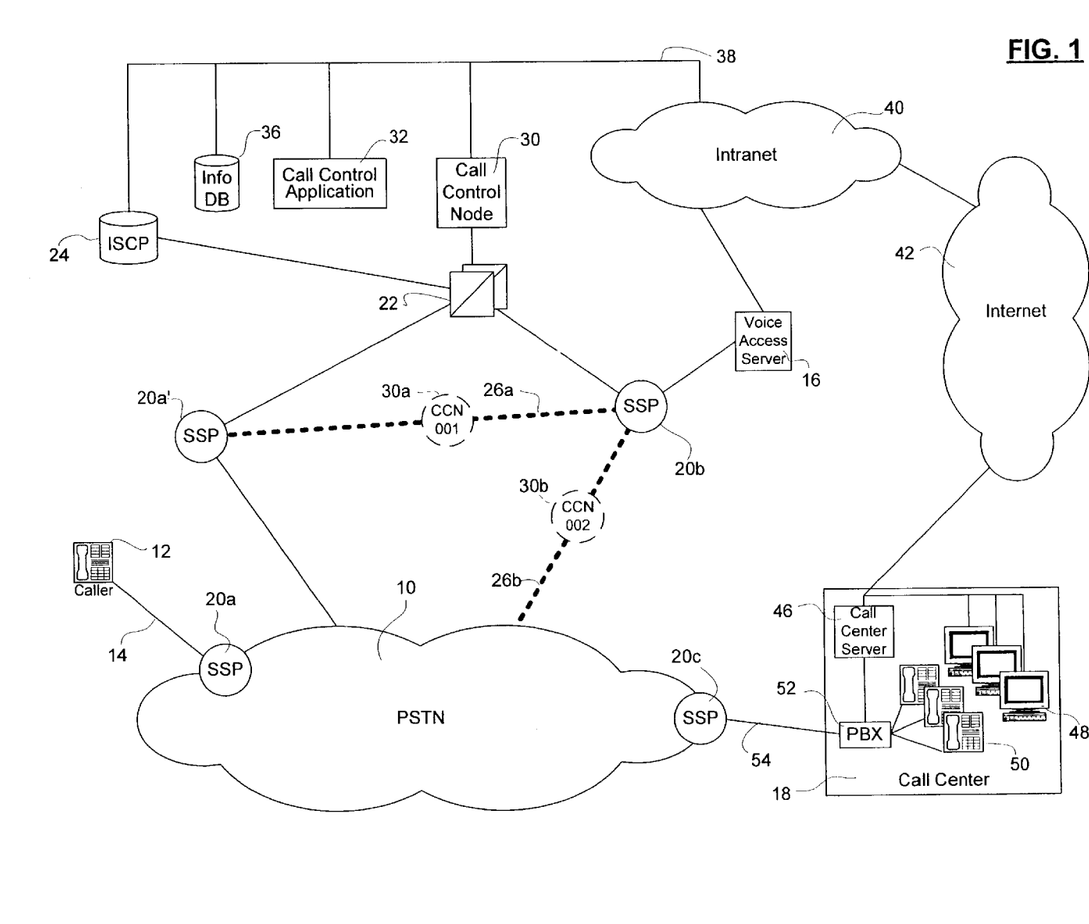
FIG. 1 is a schematic diagram of principal elements in a system in accordance with the present invention.

The present invention provides a system and method for correlating information retrieved from a data network with a call setup signaling message used to establish a connection through a switched telephone network. An identifier string is inserted into a field in the call setup signaling message that is not generally used for call control purposes. The identifier string is also inserted into query messages used to retrieve the information, and is subsequently inserted into a packet used to deliver at least some of the information. In the preferred embodiments of the invention, the call control network is a common channel signaling (CCS) network using signaling system 7 (SS7) standard signaling. Call setup signaling messages are integrated services digital network-user part (ISUP) initial address messages (IAMs), and the field is the user-user-interface (UUI) field. The identifier string is a serial number (SN), for example.
System Overview As is known in the art, the PSTN 10 includes numerous service switching points (SSPs) of which four are illustrated in FIG. 1. The SSPs 20a,c serve respective pluralities of subscriber lines. The SSP 20a, for example serves the calling party's telephone set 12 via subscriber line 14. The SSPs 20b,c each serve telephony equipment (the VAS 16 and the call center 18, respectively) over respective primary rate interface (PRI) channels, in a manner known in the art. The SSPs 20a and 20a' are so named because, for the purposes of illustration, hereinafter they will be referred to as if the two SSPs 20a,a', along with the intermediate PSTN 10 were collapsed to a single switch SSP 20a*. This simplification more readily permits the expression of the many components in the call flows that follow.

The SSPs (generically refereed to as 20) are connected to (mated) signal transfer points (STPs) 22. The STPs 22 are also connected to an intelligent service control point (ISCP) 24. Some of the signaling links in the PSTN 10 are enhanced ISUP (E-ISUP) trunks 26a,b, two of which are illustrated. Call control signaling messages for controlling each E-ISUP trunk is relayed through a virtual switching point. A single call control node (CCN) 30 can serve as the virtual signaling point in a respective set of E-ISUP trunks. As illustrated, CCN 30, identified as CCN 30a,b, is a virtual signaling point in both E-ISUP trunks 26a,b, respectively. Call control application 32 controls the CCN 30 in all of its operations.

The call control application 32 is adapted to interface with an information database (DB) 36. In particular, the call control application 32 is adapted to request that the DB send information to the VAS 16 or a server 46 associated with the call center 18.

The ISCP 24, call control application 32, CCN 30, and DB 36 are interconnected, for example by a local area network (LAN) 38, which is connected by an intranet 40 to the Internet 42. The Internet 42 is one example of a data network that may be used for transmitting the information in accordance with the invention. The intranet 40 is connected to the VAS 16, and a call center server (CC Server) 46 is connected to the Internet 42.

The CC Server 46 distributes the information to a display terminal 48 associated with a call center telephone 50 when the call received by the call center telephone 50 is associated with the same SN, as will be explained in more detail below. A private branch exchange (PBX) 52, which is exemplary of call center telephony equipment in the present embodiment, receives calls from the PSTN 10 over an integrated services digital network (ISDN) trunk 54, distributes the calls to call center telephones 50, and interfaces with the CC Server 46. As is known in the art, a centrex, a PBX, or numerous other devices adapted to distribute received calls to a plurality of internal lines, could equally be adapted to serve as telephony equipment in accordance with the present invention.

The VAS 16 is adapted to receive calls through ISDN trunks using private rate interface (PRI) signaling. It is capable of playing announcements and collecting digits or voice responses of callers. A VAS 16 is commonly adapted to re-route calls, perform conference bridging and access application servers to enable a variety of enhanced service features.

Call control nodes 30 are adapted to issue and relay call control signaling messages passing through the E-ISUP trunk 26a, 26b in which it is a virtual switching point. Under the direction of the call control application 32, the call control node 30 provides access to call connections in order to enable the provision of enhanced service features. The present invention extends this ability. The call control application 32 generates the SN, and requests information be sent to the network address associated with a directory number (DN) that was dialed by the caller.
Exemplary Methods There are many different ways that information received by a multi-line call facility can be used to provide an enhanced service feature for a correlated call. For example, displaying the information at a display terminal of a call center agent receiving the call may simplify the task of a call center agent, and make the call center operations more efficient. There are also service features that can be enabled for calls to a VAS, in substantially the same manner.

Figure 2:
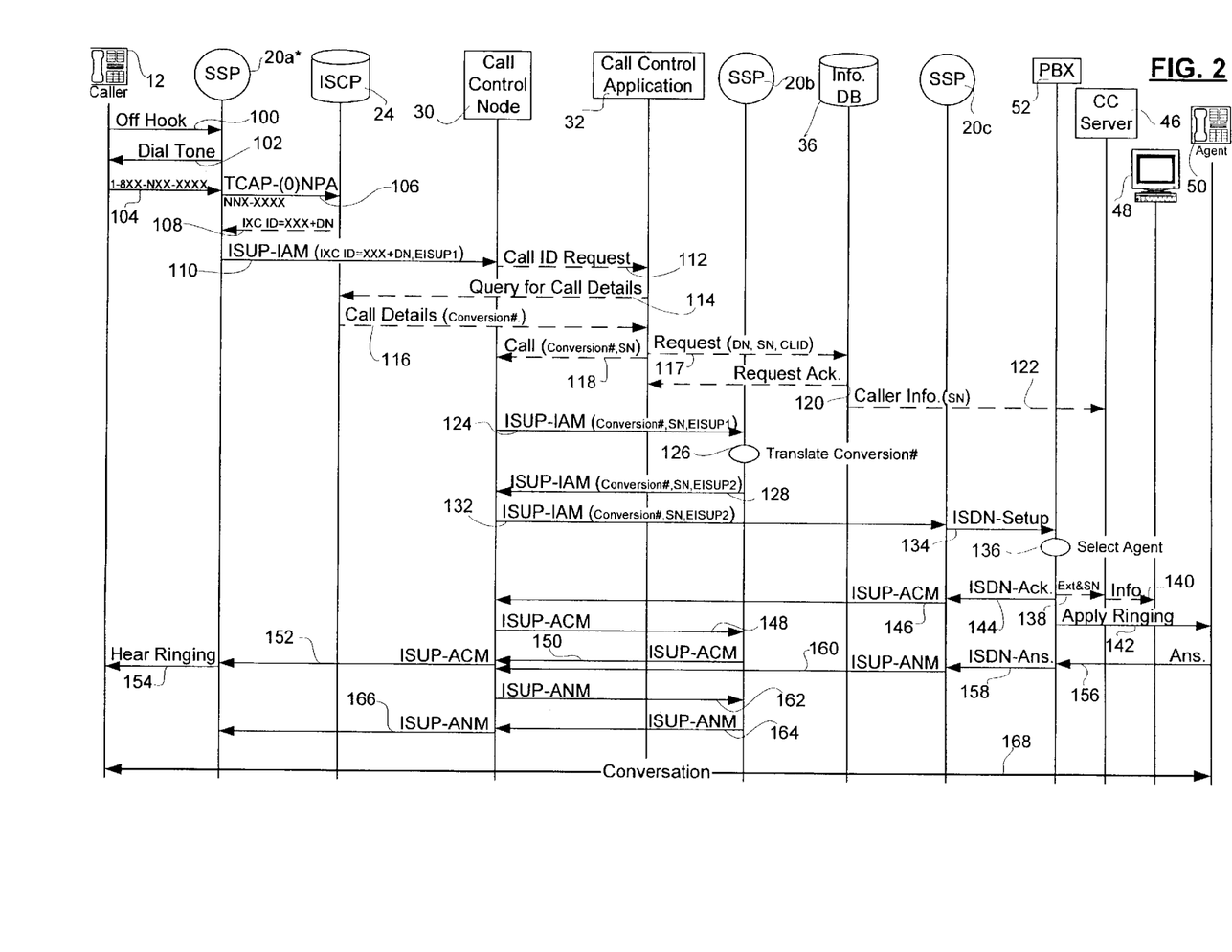
FIG. 2 is a call flow diagram illustrating principal steps involved in sending and displaying information to a call agent of a call center, wherein the call is distributed by the call center's PBX.

FIG. 2 illustrates principal messages exchanged between network elements to provide information to a call center agent together with a telephone call, in which a PBX serving the call center uses the call setup signaling message to switch the call to an agent. In step 100, the caller's telephone 12 goes off-hook. This is detected by the SSP in the PSTN 10 that serves the subscriber line 14, schematically illustrated as SSP 20a*. The SSP 20a* applies a dial tone to the subscriber line 14, in step 102. A "1-800" number is dialed by the caller (step 104), and the SSP 20a* issues a TCAP query to the ISCP 24 (step 106). The query includes the 1-800 number and all other available call details, such as CLID or ANI or trunk information. The ISCP 24, in step 108, returns a routing number (DN) that contains, for example, an inter-exchange carrier identifier (IXC ID), (that is translated by the SSP 20a* to generate an ISUP-IAM to the CCN 30a). After reserving an E-ISUP trunk 26a, in a manner known in the art, the IAM is sent in step 110.

The CCN 30a receives the IAM, and queries the call control application 32 for call identification (step 112). The call control application 32 formulates and sends a TCAP query to ISCP 24, requesting information regarding the call identified by the routing number (step 114). In step 116, the ISCP 24 replies to the query sending the conversion number and the other available call details derived from the dialed directory number, in a manner known to those skilled in the art. The call control application 32 then executes an algorithm using the conversion number, calling number identification (CLID), automatic number identification (ANI) and/or any other information about the call available through the response and the IAM, in order to identify enhanced service features applicable to the call. Because the conversion number is the directory number of the call center, and the call center subscribes to an enhanced service feature requiring information from the DB 36 to be sent to the call control server 48 during the call set-up, the algorithm determines that the DB 36 needs to be queried. As a result of the algorithm, the call control application 32 sends an information delivery request containing the SN to the DB 36 (step 117). The call control application 32 also commands the call control node 30a to forward the IAM with the conversion number, to SSP 20b (step 118).

The DB 36 acknowledges the information delivery request (step 120) and performs a search to retrieve information. Advantageously the information can be specific to the CLID as well as the directory number called (in this case, the conversion number). The information retrieved is sent with the SN to the CC Server 46, in at least one internet protocol (IP) packet (step 122).

Meanwhile the call control node 30a, upon receipt of the command, forwards the IAM to the SSP 20b, with the conversion number substituted for the routing number (step 124). The SSP 20b reserves the opposite end of the E-ISUP trunk reserved by SSP 20a*, translates the conversion number (step 126), and forwards the IAM as directed by the translation, (step 128). The IAM is received by CCN 30b, and forwarded to SSP 20c through the PSTN 10. The call is advanced hop-by-hop through the PSTN 10 in a manner known in the art, and arrives at the SSP 20c in step 132. In step 134, the SSP 20c issues an ISDN setup message to the PBX 52. The PBX 52 receives the setup message, extracts the SN, and assigns an internal line of an available agent to the call (step 136). The PBX then sends the SN and the extension of the internal line to the CC Server 46, in a call notification message (step 138). The CC Server 46 uses the SN to correlate the information sent from the DB 36 in step 122 with the call, and performs enhanced service features for the call accordingly. This includes sending information to the display terminal 48 associated with the internal line (step 140). The PBX 52 applies ringing to the assigned internal line (step 142).

Meanwhile, the ISDN setup message is acknowledged by the PBX 52 (step 144), prompting the SSP 20c to issue an address complete message (ACM) to the previous switch in the call connection path. This ACM is relayed back to the CCN 30b in step 146, from there to the SSP 20b in step 148, on to the CCN 30a in step 150, and to the SSP 20a* in step 152. At this juncture, the calling party can hear ringing at the opposite end of the line (step 154).

The agent picks up the assigned internal line, which generates an off-hook signal detected by the PBX 52, in step 156. The PBX 52 issues an ISDN-answer message to the SSP 20c (step 158). Much as the ACMs cascaded back along the call connection, answer messages (ANMs) are relayed through the PSTN to the CCN 30b, to the SSP 20b, to the CCN 30a, and to the SSP 20a* in steps 160, 162, 164, and 166 respectively. The call is, in step 168, underway.

One major advantage that the present invention has over prior art methods is that caller information can be transmitted to the call center before the incoming call is received. The caller information can be used to generate information useful for directing the selection of a call center agent to receive the call. If call center is used for international calls, and has call center agents with different linguistic abilities, the originating area of the call can be used to identify the probable linguistic preference of the calling party. Furthermore, the CLID may be used to identify a calling party who has called before and for whom the linguistic preference has already been ascertained.

Figure 3:
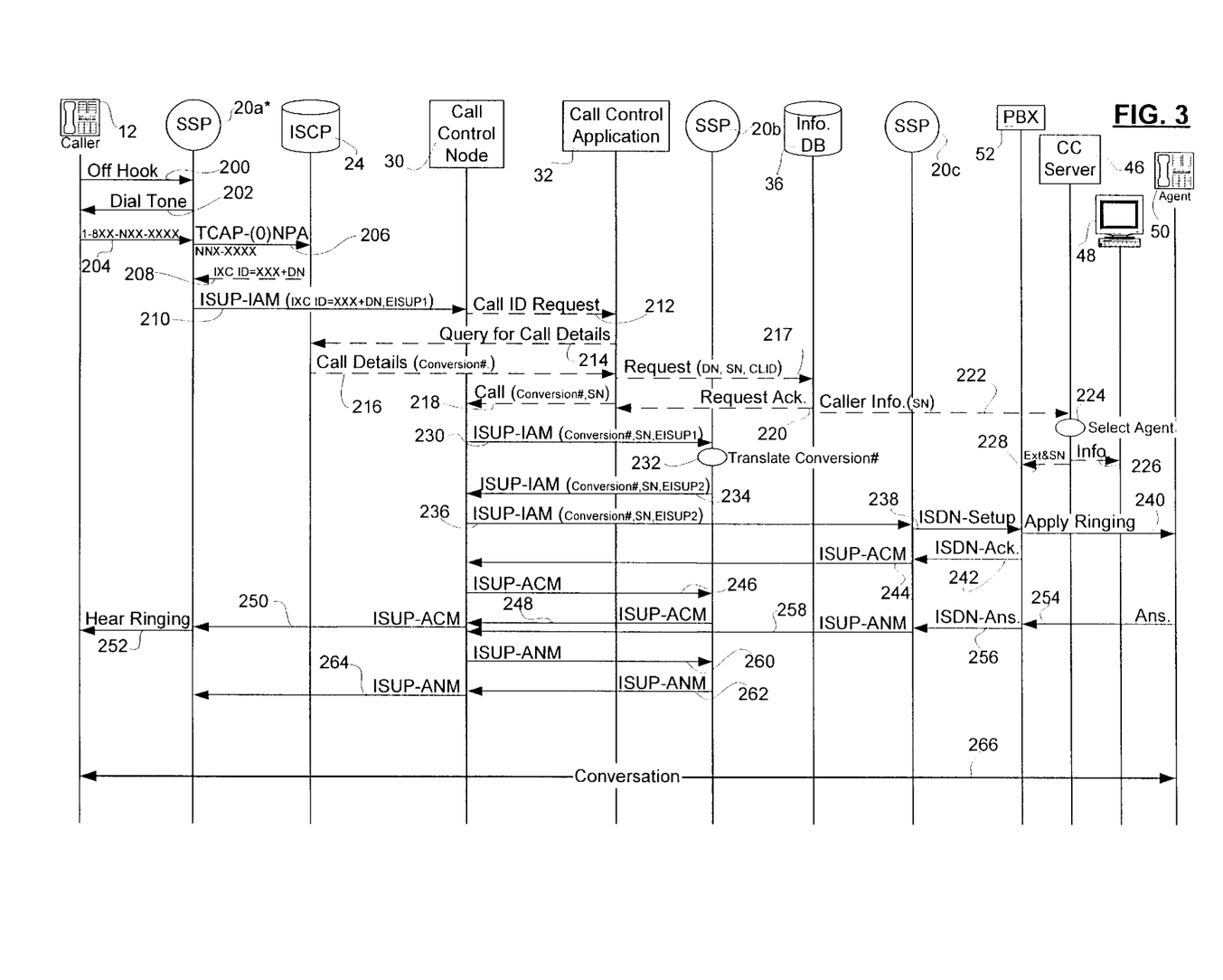
FIG. 3 is a call flow diagram illustrating principal steps involved in sending and displaying information to a call agent of a call center, wherein the call is distributed according to the information.

FIG. 3 is a call flow diagram illustrating principal steps involved in using the information received over a data network to direct the selection of the agent to serve the call.

Steps 200–222 are the same as steps 100–122 of FIG. 2, and so their description will not be repeated here. When the information, which includes caller information and the SN, arrives at the CC Server 46, in step 222, the CC Server 46 analyzes the information to determine an internal line associated with an agent, to receive the forthcoming call (step 224). If the call happens to arrive before the information, which is a possibility, the call will be held until the information is received and analyzed. The selection could be based on any part of the information, and may include linguistic preferences or call history statistics, for example.

Once the agent has been selected, the CC Server 46 sends information to the display terminal 48 associated with the agent (step 226). The display terminal 48 will then presents the caller information to the agent, providing the agent with the information about the calling party. In step 228, the CC Server 46 sends a message to the PBX 52, directing the PBX to switch a call containing the SN to the internal line of the agent, so that the agent's telephone set 50 receives the call.

Steps 230, 232, 234, 236, and 238 correspond with steps 124, 126, 128, 132, and 134 respectively described above. The initial address message IAM is forwarded through the PSTN 10 to the PBX 52. The PBX 52 extracts the SN from the IAM, and reserves the agent's line for the call, in a manner known in the art. The PBX 52, in step 240, applies ringing to the agent's telephone, and, in step 242, issues an ISDN acknowledgement to the SSP 20c. The Ack message initiates a cascade of ACMs (steps 244–250), and the calling party hears ringing.

When the agent picks up the telephone, in step 254, the PBX 52 issues an ISDN-Answer message (step 256) that initiates a similar cascade of ANMs (steps 258–264). The conversation between the agent and the calling party is now underway (step 266).

A final illustrative embodiment of the present invention, involves a call to a VAS 16. The VAS 16 can be used to replace a call center in certain circumstances. Especially for the performance of repetitive tasks that assist clients, but do not require as high a level of interaction as can be offered by a call center agent.

Figure 4:
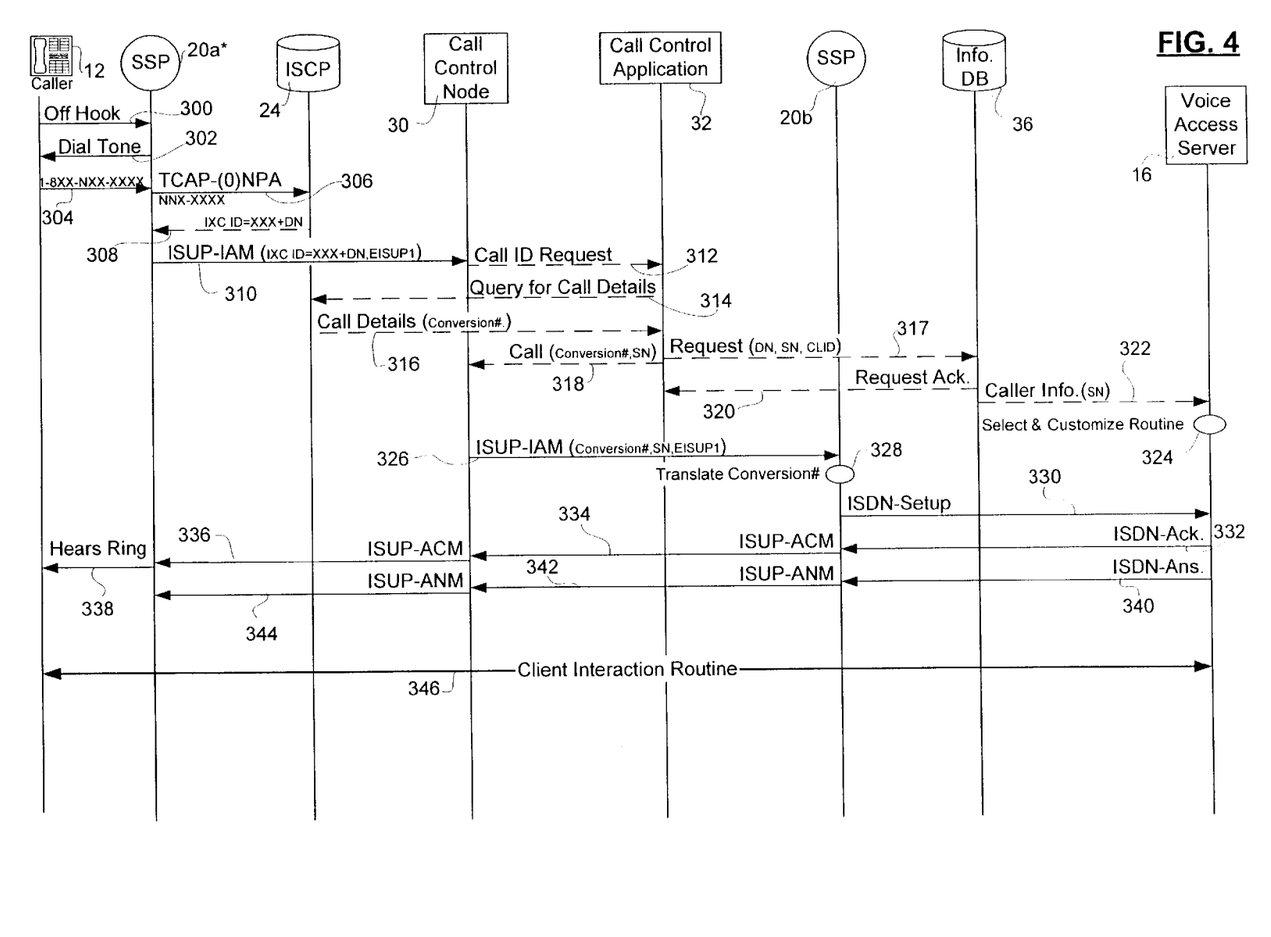
FIG. 4 is a call flow diagram illustrating principal steps involved in sending information to a voice access server (VAS) wherein the information is used to select and customize a client interface routine to be performed by the VAS.

FIG. 4 is a call flow diagram illustrating principal steps involved in terminating a call to a VAS 16, wherein the client interaction routine that the VAS 16 performs is tailored to the client, using information delivered to the VAS 16 before the call is terminated. The calling party of FIG. 4 is a client of the service provider that operates the VAS 16. The VAS 16 may supply information over the phone, or issue data network messages to a selected network address, or perform any of the actions VASs are known to perform.

Steps 300–322 are the same as steps 100–122 of FIG. 2, and their description will not be repeated here. When the information, which includes caller information and the SN, arrives at the VAS 16, in step 322, the VAS 16 uses the information, including the caller information, to select from a menu of voice interaction routines, a preprogrammed routine of voice prompts. The information may further customize the selected routine, permitting the insertion of a name or other client-specific information into the routine, to add a personal touch to the routine, for example. The customization and selection of the client-interaction routine is performed in step 324.

The IAM is forwarded to the SSP 20b by the CCN 30a (step 326), as directed by the call control application 32 in step 318. The SSP 20b translates the conversion number, which addresses the VAS 16, and consequently issues an ISDN-setup message to the VAS 16 (step 330). The VAS 16 returns an acknowledgement message (step 332), which initiates a familiar cascade of ACMs back through the call connection path to SSP 20a* (steps 334,336) and the calling party hears ringing, in step 338.

In step 340, the ISDN line to the VAS is answered, triggering the issue of an ISDN-answer message to SSP 20b (step 340), and ANMS to CCN 30a (step 342), and SSP 20a* (step 344). The VAS 16 commences the selected and customized client interaction routine (step 346).

It is an advantage to the service provider of the VAS 16 that the voice interaction routines that slow down the calling party's access to the service provided, be avoided where possible. The time taken for recurring callers to re-select language preferences, client information, or client identification numbers, can be avoided or expedited by using the CLID of the incoming call in accordance with the present invention. Shortening the average duration of calls to the VAS effectively increases the number of calls a VAS can support, and reduces network usage charges.

The embodiment(s) of the invention described above is (are) intended to be exemplary only. The scope of the invention is therefore intended to be limited solely by the scope of the appended claims.

We claim:

1. A method for correlating information delivered through a data network with a call established through a switched telephone network to a facility adapted to serve a plurality of calls simultaneously, comprising steps of:
   inserting an identifier string into a call setup signaling message used to establish the call to the facility;
   delivering the information with the identifier string through the data network to the facility; and
   using the respective identifier strings to correlate the information with the telephone call after receiving the call setup signaling message and the information at the facility, in order to provide an enhanced service feature.

2. The method as claimed in claim 1 wherein inserting the identifier string into the call setup signaling message further comprises steps of:
   forwarding the call setup signaling message through a virtual switching point (VSP) in the switched telephone network; and
   controlling the virtual signaling point to insert the identifier string into the call setup signaling message before forwarding the call setup signaling message through the switched telephone network, toward the facility.

3. A method as claimed in claim 2 wherein the call setup signaling message is an Integrated Services Digital Network User Part (ISUP) Initial Address Message (IAM) and the VSP inserts the identifier string into a User-User Interface field of the IAM.

4. The method as claimed in claim 2 wherein the step of delivering comprises steps of:
   receiving the call setup signaling message at the VSP in the switched telephone network;
   extracting content from the call setup signaling message, the content being used to launch a query to a database in the data network;
   generating the identifier string; and
   formulating a query message containing the content, and the identifier string, effecting the delivery of a response to the query containing the information and the identifier string, to the facility.

5. A method as claimed in claim 4 further comprising a step of determining, with the extracted content, at least one database to be queried in order to provide the enhanced service feature requested for the call.

6. A method as claimed in claim 4 wherein the response to the query message is forwarded, from the database, to the facility without being re-directed by the call control application.

7. A method as claimed in claim 6 wherein the response to the query message comprises at least one packet, and contains the identifier string.

8. A method as claimed in claim 6 wherein the step of delivering further comprises steps of:
   receiving the response to the query message at a data server associated with the facility;
   extracting the identifier string from the response to the query message;
   sending the identifier string to telephony equipment adapted to terminate the telephone calls at the facility; and
   waiting for the telephony equipment to return data to permit the information to be delivered to a display terminal associated with a telephone extension served by the telephony equipment.

9. The method as claimed in claim 8 wherein the data returned by the telephony equipment is an extension number, and the method further comprises steps of:
   receiving the extension number from the telephony equipment;
   using a lookup table to determine a data address of a display terminal associated with the extension number; and
   forwarding at least some of the information contained in the response to the data address to be displayed by the display terminal.

10. The method as claimed in claim 6 further comprising steps of:

receiving the response to the query message at a data server associated with the facility;

extracting information from the response;

using the information to determine a preferred extension number for terminating the call;

extracting the identifier string from the response to the query message;

instructing the telephony equipment to connect the call initiated with the call setup signaling message containing the identifier string, to the preferred call extension number; and delivering at least some of the extracted information to a display terminal associated with the extension number sent to the telephony equipment.

11. The method as claimed in claim 10 wherein the step of using the information comprises steps of:

using the information to determine a set of agents having skills required to handle the call;

selecting a member of the set of agents that is available to take the call; and obtaining an extension number of the telephone-of the agent.

12. A method as claimed in claim 6 further comprising steps of:

receiving the response to the query message through a data network interface of the facility, which is a voice access server; and analyzing the information contained in the response, in order to determine a set of service features to perform for the call;

receiving the call setup signaling message with the same identifier string via a telephone network interface;

correlating the call setup signaling message with the response, using the identifier strings; and performing the set of service features to the correlated call initiated with the call setup signaling message.

13. A method as claimed in claim 12 wherein the step of analyzing comprises a step of using the information to select a client interaction routine to serve the calling party.

14. A method as claimed in claim 12 wherein the step of analyzing comprises a step of using the information to customize a client interaction routine to serve the calling party.

15. A method of coordinating the delivery of information through a data network with a call initiated using a call setup signaling message to a predetermined directory number (DN) through a switched telephone network (STN), comprising steps of:

forwarding the call setup signaling message to a trunk in the STN controlled by a virtual switching point (VSP), so that the VSP lies in a signaling message path for the call;

inserting an identifier string into the call setup signaling message, when the call setup signaling message is received at the VSP;

inserting the identifier string and predetermined data from the call setup signaling message into a query message sent to a database in the data network to effect the retrieval of information associated with a calling party;

forwarding the information and the identifier string to a data server associated with a facility that also terminates calls to the DN; and correlating the call setup signaling message with the information using respective identifier strings.

16. The method as claimed in claim 15 wherein the step of inserting an identifier string into the call setup signaling message comprises steps of:

receiving, at a call control application that controls a call control node that serves as the VSP in the call connection path, data extracted from the call setup signaling message;

generating a unique identifier string to reference the call; and sending a control message to the call control node, which prompts the call control node to forward the call setup signaling message with the identifier string toward the facility.

17. The method as claimed in claim 16 wherein the call control application also inserts the identifier string and data from the call setup signaling message into the query message sent to a database in the data network.

18. The method as claimed in claim 15 wherein the step of correlating comprises steps of:

forwarding the identifier string from the server to telephony equipment that handles calls routed through the STN to the DN;

waiting for the telephony equipment to return an extension number to which the call is to be terminated;

on receipt of the extension number, using the extension number to determine a data workstation to deliver the information to; and delivering the information to the data workstation.

19. A system for correlating information received from a data network at a facility with a call made through a switched telephone network (STN) to the facility's telephony equipment, which is adapted to serve a plurality of calls simultaneously, the system comprising;

a call control node interfacing a trunk in a telephone network adapted to perform call control messaging as commanded by a call control application, including the ability to insert an identifier string into a call setup signaling message;

the call control application adapted to exchange messages with the call control node and to effect the delivery of the information with a copy of the identifier string, to a data server associated with the facility; and a data server of the facility that receives the information, and uses the accompanying identifier string to correlate the information with the call, wherein said information is used to perform an enhanced service feature.

20. A system as claimed in claim 19 further comprising an information database which is adapted to; receive an information delivery request from the call control application, retrieve information, and send the information to the server along with an accompanying identifier string contained in the information delivery request.

21. A system as claimed in claim 20 wherein the information database is further adapted to obtain a network address of the data server from a search with parameters supplied by the information delivery request, and to send the information accompanied by the identifier string, to the network address.

22. A system as claimed in claim 20 wherein the information database is a server farm.

23. A system as claimed in claim 19 wherein the data server is a call center server interconnected with the telephony equipment, which is a call distributor, the call center server being adapted to provide the enhanced service feature with the PBX.

24. A system as claimed in claim 23 further comprising a display terminal associated with each internal line of the PBX, wherein said display terminal is adapted to display information regarding a calling party, as at least a part of the enhanced service feature.

25. A system as claimed in claim 23 wherein the information is used by the facility, which is a call center, to select an internal line to serve the call, as at least a part of the enhanced service feature.

26. A system as claimed in claim 25 wherein the PBX is adapted to, upon receipt of a message from the call center server correlating an identifier string with an extension number, switch a call initiated with a call setup signaling message containing the identifier string, to the internal line identified by the extension number.

27. A system as claimed in claim 19 wherein the facility comprises a data server connected with the telephony equipment, which is a voice access server (VAS), wherein the data server is adapted to analyze the information received with the identifier string in order to select a client interaction routine that the VAS is adapted to perform for the call established with the call setup signaling message containing the same identifier string.

28. A system as claimed in claim 19 wherein the facility comprises a server connected with the telephony equipment, which is a voice access server (VAS), wherein the server is adapted to analyze the information received with the identifier string in order to customize a client interaction routine that the VAS is adapted to perform for the call established with the call setup signaling message containing the same identifier string.

* * * * *